United States Patent
Wakeman et al.

(10) Patent No.: US 6,504,984 B1
(45) Date of Patent: Jan. 7, 2003

(54) APPARATUS FOR DELIVERING SMOOTHED LIGHT FROM AN UNEVEN SOURCE

(75) Inventors: Mark Lucas Wakeman, Rowayton, CT (US); Ronald S. Eppert, Norwalk, CT (US)

(73) Assignee: US Sign and Fabrication Ccorporation, Trumbull, CT (US)

( * ) Notice: Subject to any disclaimer, the term of this patent is extended or adjusted under 35 U.S.C. 154(b) by 0 days.

(21) Appl. No.: 09/717,882

(22) Filed: Nov. 21, 2000

(51) Int. Cl.[7] ................................................ G02B 6/00
(52) U.S. Cl. .................................... 385/133; 385/115
(58) Field of Search .............................. 385/115, 120, 385/133, 24, 43

(56) References Cited

U.S. PATENT DOCUMENTS 5,109,465 A * 4/1992 Klopotek ...................... 385/133
6,152,577 A * 11/2000 Rizkin et al. ................ 362/281
6,272,269 B1 * 8/2001 Naum .......................... 385/43

* cited by examiner

*Primary Examiner*—Akm E. Ullah
*Assistant Examiner*—Jerry T Rahll
(74) *Attorney, Agent, or Firm*—St. Onge Steward Johnston & Reens LLC

(57) ABSTRACT

A light blender is described wherein light from a high intensity source such as a metal halide bulb can be conveyed through a flexible optical fiber cable for projection onto a remotely located site without uneven segments to uniformly illuminate the remote site. The optical light blender is of sufficient length so as to enable light from the light source to reach the end of the light blender with a large number of reflections from the wall of the light blender and thus produce blended light for uniform illumination.

9 Claims, 4 Drawing Sheets

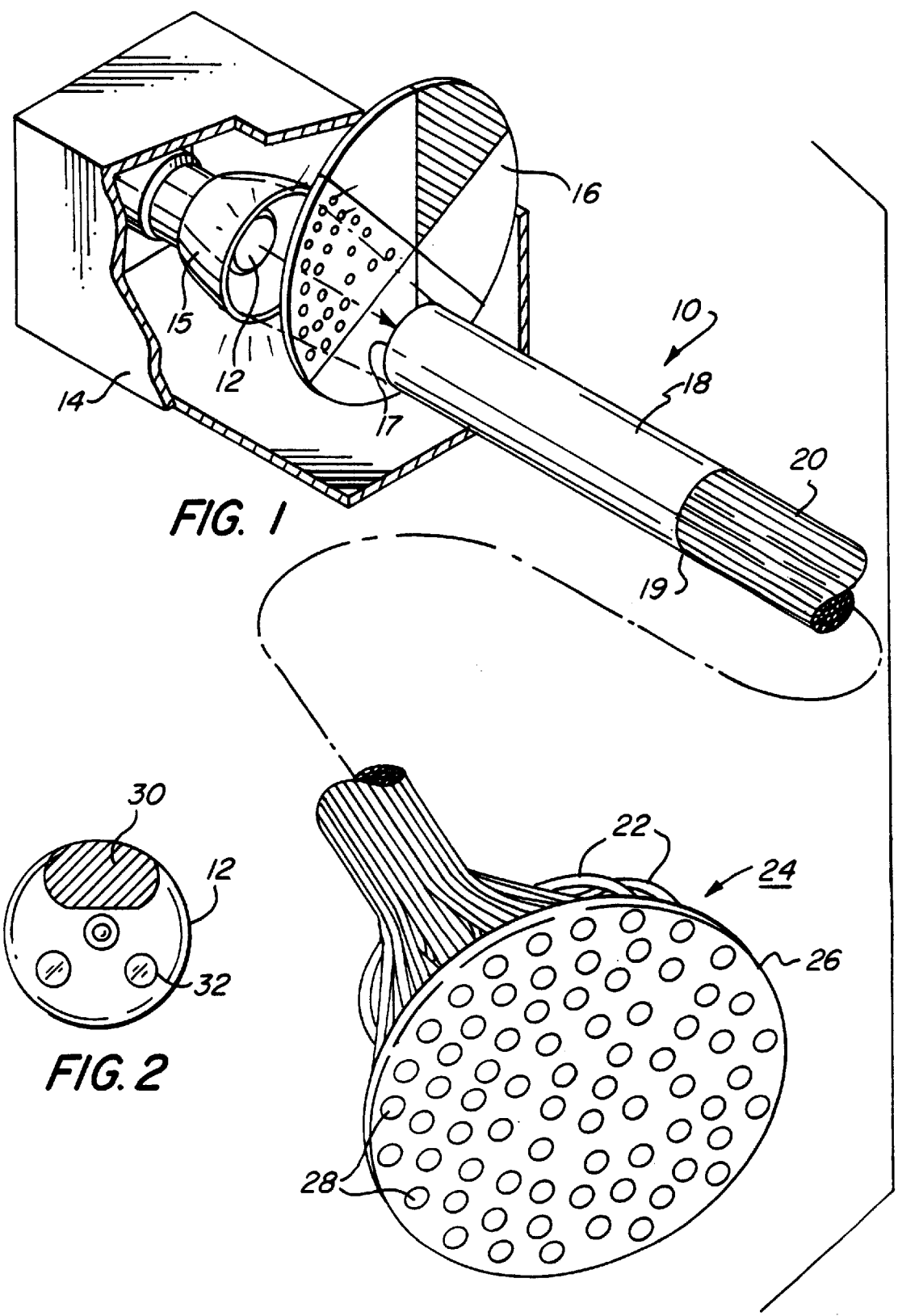

APPARATUS FOR DELIVERING SMOOTHED LIGHT FROM AN UNEVEN SOURCE

FIELD OF THE INVENTION

This invention generally relates to an apparatus for illuminating a sign through a fiber optical cable and more specifically to a device with which light from light source can be smoothed to produce a more uniform distribution.

BACKGROUND OF THE INVENTION

Devices are known with which light from a high intensity source, such as a metal halide bulb, is distributed to a remote site through an optical fiber cable. The light from such source, however, is not always uniformly distributed over the bulb's surface area. Hence, variations both in color and intensity tend to arise and the variations are faithfully reproduced by the optical fiber cable at the latter's distal end. Hence, some of the fibers illuminate an object with unevenly distributed light and this unevenness becomes visibly apparent and frequently undesirable.

This unevenness in light distribution tends to change or shift around with aging of the light source and thus cause different fibers to project different light intensities as brown colored or sulfur-related deposits form on the inside of the light bulb. There thus exist a need to provide a uniform light distribution at the from an uneven light source over its life span and particularly at the end of an optical fiber cable whose proximal end receives light from the source.

SUMMARY OF THE INVENTION

With an apparatus in accordance with the invention one can even out unequal distributions of light from a light source such as an intense halide light bulb. This is achieved with an elongate light blending transparent conduit positioned to intercept light from the light source at one end. The light blending conduit has sufficient length to enable light from the source to be subjected to multiple reflections from an internal wall and thus produce a substantially even distribution of light at the other end of the conduit.

With an apparatus according to the invention an intense light source can be distributed by a fiber bundle to a remote location with an even distribution of light so that each light fiber delivers substantially the same intensity. As a result the optical fibers can illuminate an object such as a sign in an even manner even when the light source itself may have light discontinuities across its surface. The effect of the light blending conduit enables one to preserve a uniform light distribution even as the light source itself changes over time and develops yellow or dark spots that would be visibly disturbing at the object illuminated by the light source.

It is, therefore, an object of the invention to provide an apparatus with which light from an uneven light source can be delivered with a uniform distribution and with low losses to effectively reduce heating of the conduit from light incident from a high intensity light source.

It is a further object of the invention to provide an apparatus with which light from an intense source such a metal halide bulb can be delivered by an optical fiber bundle onto an object with an even distribution of light from the fibers.

It is still further an object of the invention to provide an apparatus with which light from a high intensity source such as a metal halide bulb can be dimmed without disturbing the even light distribution provided by a light blender positioned to receive focused light from the source.

These and other advantages and objects of the invention can be understood from a detailed description of the drawings as briefly described below.

BRIEF DESCRIPTION OF THE DRAWINGS

FIG. 1 is a perspective partially broken away view of one apparatus in accordance with the invention with which a uniform distribution of light can be obtained from a high intensity light source;

FIG. 2 is a front end view of a high intensity light source with non-uniform light emission;

DETAILED DESCRIPTION OF THE DRAWINGS

Figure 3:
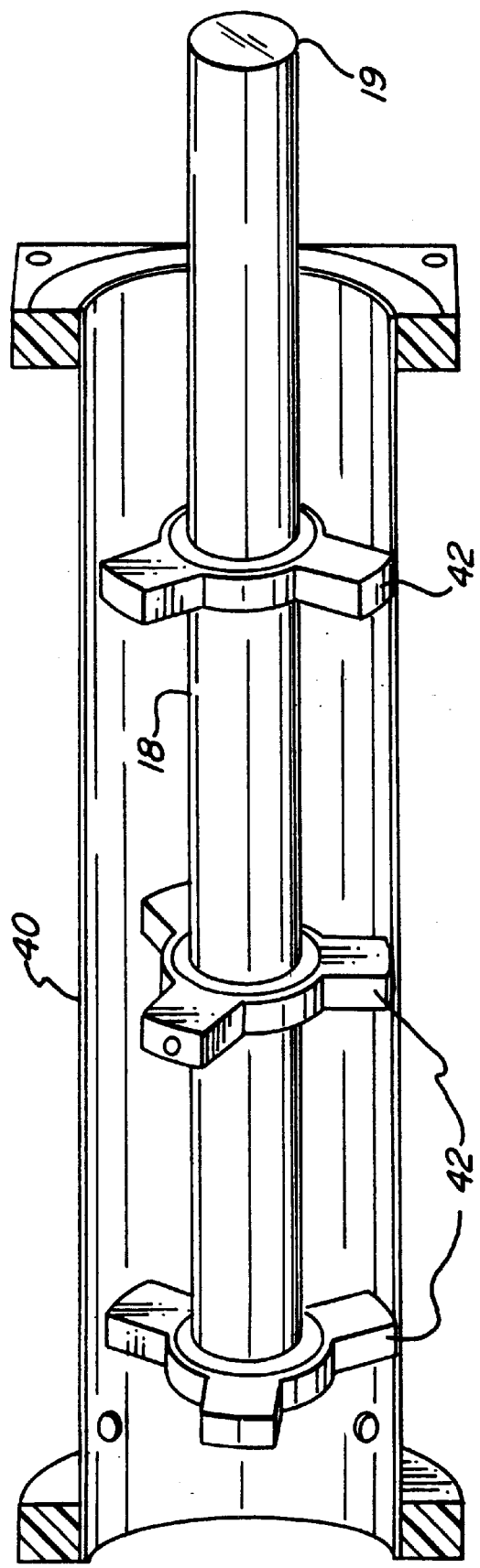
FIG. 3 is a broken away side perspective view of a light blender in accordance with the invention.

With reference to FIG. 1 an apparatus 10 is shown for providing a uniform light illumination at a remote location. The apparatus includes a high intensity light source such as a metal halide bulb 12 located inside a housing 14. The light bulb is surrounded by a parabolic reflector 15, which focuses light through a rotationally mounted dimmer 16 at a proximal end 17 of a light blender conduit 18. The light blender 18 in turn has its distal end 19 optically coupled to an optical fiber cable 20 formed with a large number of optical fibers 22. The fiber cable 20 terminates at a distal end 24 at a plate 26, which retains the ends 28 of fibers 22 to direct light emanating from the fibers at an object. The object can be many different things, but in this particular case is a sign, not shown, whose back can be illuminated with the light from the fibers 22.

As illustrated in FIG. 2 the light source 12 typically may have a number of optical discontinuities such as 30 and 32, which can be areas of weaker light or discolorations. The discontinuities tend to be faithfully reproduced at the distal end 24 of the optical fiber cable 20 so that the object being illuminated is viewable with light and dark spots and unusual colors that are not compatible with what is desired. Accordingly, the invention provides a light blender 18 with which the light incident on its proximal end 17 is blended to provide an even distribution across the face of the proximal end of the optical fiber cable 20.

The light blender 18 is preferably cylindrical with a length and diameter selected to enable light incident upon the proximal face 17 to have a sufficient multiple reflections from an internal wall of the conduit so as to cause an even distribution of light at the distal end 19. The length must be sufficiently long lest the light does not fully blend and preferably is not made too long lest the overall length of the apparatus 10 becomes too large. Typically the diameter can be of the order of about 19 mm and the length can be about 210 mm, though different dimensions can be employed. The effective scattering of the light inside blender 18 assures that an even distribution of light occurs at the distal end 19.

Figure 4:
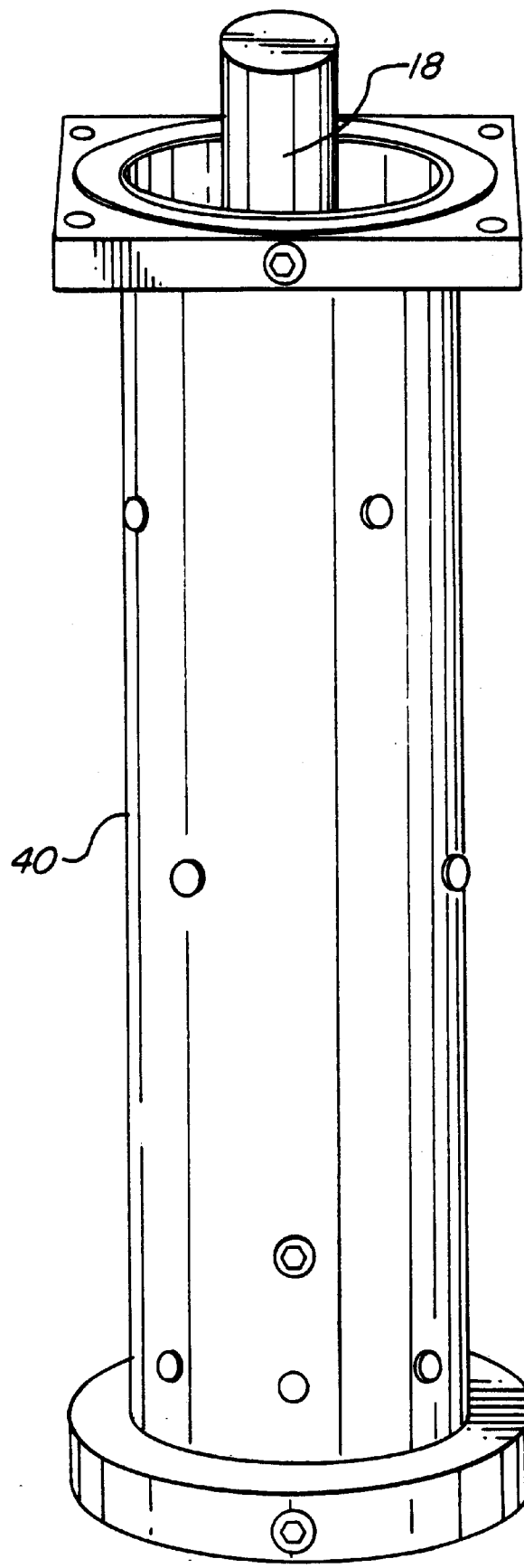
FIG. 4 is a side perspective view of a light blender in accordance with the invention.

As illustrated in FIGS. 3 and 4 the light blender conduit is mounted inside a housing extension 40. This is attachable to the housing 14 to capture focused light form the source 12 onto the proximal end 17. The light blender 18 is suspended inside housing 40 with spacers 42. The distal end 19 is optically coupled to optical fiber cable 20 using conventional coupling devices as are well known. The light blender 18 can be made of an acrylic optically transparent plastic material.

Light dimming is obtained with a mechanical dimmer 16 mounted to rotate in front of the light source 12 and intercept its light beam. Dimmer 16 has sectors 44 with different densities of holes 46. Hence by rotating a different sector 44 variations in light intensity incident on the light blender 18 can be achieved for a corresponding dimming or increase of light. Dimmer 16 typically is made of metal.

Figure 5:
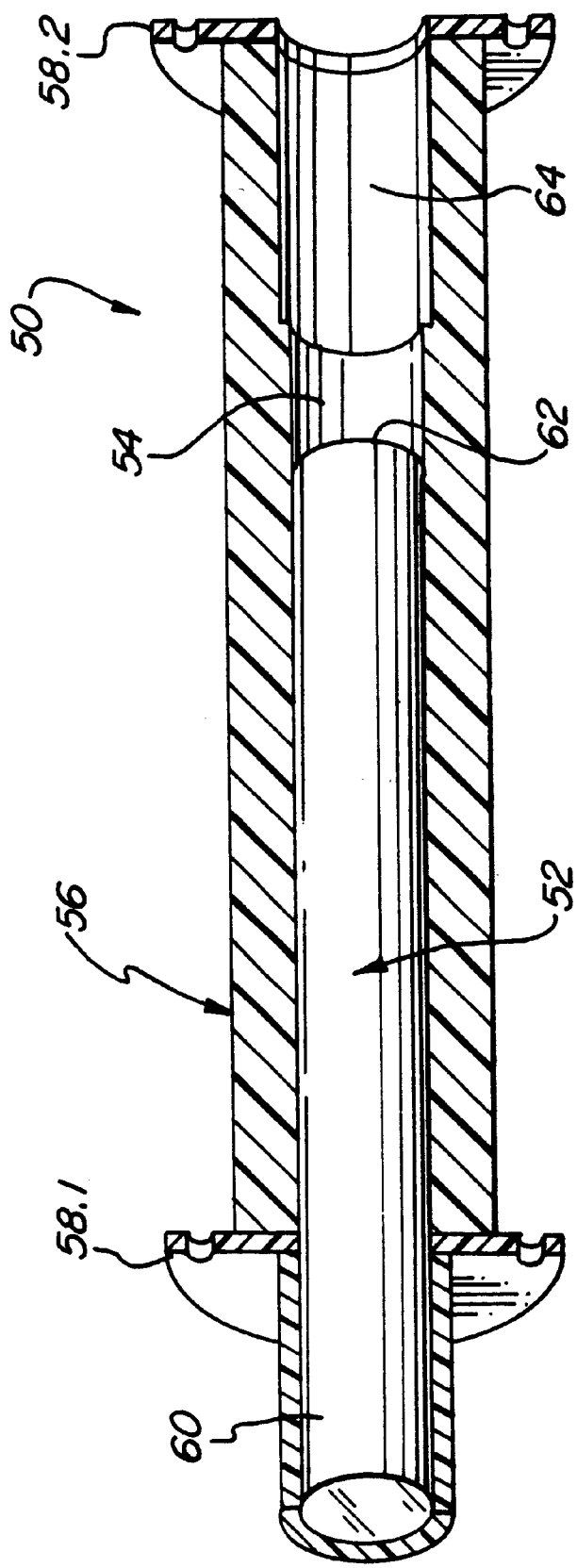
FIG. 5 is a side perspective view of another light blender in accordance with the invention.

FIG. 5 illustrates another form for a light blender 50 in accordance with the invention. The light blender 50 is formed of a solid fiber rod 52, which is a light blending conduit, and is inserted into a bore 54 of a thermoplastic acetal holder 56. The holder is cylindrical in shape and is provided with end plates 58.1 and 58.2, typically also of plastic, to suspend the fiber rod 52 in a central manner as illustrated in FIG. 3 for light blender 18. An end 60 of light rod 52 extends from end plate 58.1 receive light from a light source 12 as shown in FIG. 1.

Light rod 52 terminates at 62 within the bore 54 which has sufficient room left to receive at 64 a connector or end portion of flexible optical fiber cable 20 and thus transfer light to a cable 20.

Having thus described a light blender in accordance with the invention its advantages can be appreciated. Variations of the described embodiments can be made without departing from the scope of the invention as defined by the following claims.

What is claimed is:

1. An apparatus for delivering light from a high intensity source, comprising:

an optical fiber cable formed with a plurality of optical fibers arranged to deliver light from a proximal end to a distal end of the cable;

a light blending conduit formed from a solid piece of optically transparent material having an internal smooth cylindrical wall with a constant cross-section and being positioned adjacent to the source to receive light from the source at a proximal end and deliver the light to a distal end of the light blending conduit with multiple light reflections from the internal wall of the conduit;

the optical fiber cable having its proximal end placed adjacent the distal end of the light blending conduit to receive light therefrom, said conduit having a length sufficient to enable different intensity regions of the light source to mix with each other as a result of the multiple reflections to deliver light with which the different intensity regions have been smoothed at the distal end of the light blending conduit;

whereby the smoothed light incident on the proximal end of the optical fiber cable can be delivered by the optical fiber cable to its distal end with a uniform intensity distribution.

2. The apparatus as claimed in claim 1 wherein the light blending conduit has a cross-sectional size that is substantially equal to that of the optical fiber cable.

3. The apparatus as claimed in claim 2 wherein the light blending conduit is formed of a thermoplastic material.

4. An apparatus for delivering light from a high intensity source, comprising:

a housing and a high intensity light source mounted inside the housing and mounted to direct light at a region in the housing;

a light blending conduit formed from a solid piece of optically transparent material having an internal smooth cylindrical wall with a constant cross-section and being positioned adjacent to the source to receive light from the source at a proximal end located within said housing and deliver the light to a distal end of the conduit with multiple light reflections from the internal wall of the conduit;

an optical fiber cable formed with a plurality of optical fibers arranged to deliver light from a proximal end to a distal end of the cable; the proximal end of the optical fiber cable being mounted in front of said distal end of the light blending conduit to receive light therefrom;

said conduit having a length sufficient to enable different intensity regions of the light source to mix with each other to deliver light with which the different intensity regions have been smoothed at the distal end of the conduit;

so that light received at the proximal end of the optical fiber cable can be delivered to its distal end with a generally uniform intensity distribution.

5. The apparatus as claimed in claim 4 and further including a movable light dimmer mounted in between the light source and said light blending conduit to vary the amount of light incident on the proximate end of said conduit.

6. The apparatus as claimed in claim 5 wherein said light dimmer comprises a rotationally mounted plate having segments of different optical transparency to enable a rotation of the dimmer to vary light intensity.

7. The apparatus as claimed in claim 5 wherein said light source is a metal halide bulb.

8. The apparatus as claimed in claim 4 wherein said light blending conduit is suspended within the housing and wherein said light source has a reflector to direct a focused high intensity light beam onto said proximal end of the light blending conduit.

9. An apparatus for delivering light from a high intensity source, comprising:

a light blending conduit formed from a solid piece of optically transparent material having an internal smooth cylindrical wall with a constant cross-section and being positioned adjacent to the source to receive light from the source at a proximal end and deliver the light to a distal end of the conduit with multiple light reflections from the internal wall of the conduit;

said conduit having a length sufficient to enable different intensity regions of the light source to mix with each other as a result of the multiple reflections to deliver light in which different intensity regions have been smoothed at the distal end of the conduit;

whereby the smoothed light incident on the distal end of the conduit can be delivered with a uniform intensity distribution.

* * * * *